United States Patent
Dayka et al.

(10) Patent No.: US 9,729,327 B2
(45) Date of Patent: *Aug. 8, 2017

(54) COMPUTER-BASED OPTIMIZATION OF DIGITAL SIGNATURE GENERATION FOR RECORDS BASED ON EVENTUAL SELECTION CRITERIA FOR PRODUCTS AND SERVICES

(71) Applicant: International Business Machines Corporation, Armonk, NY (US)

(72) Inventors: John C. Dayka, New Paltz, NY (US); Anthony T. Sofia, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 18 days.

This patent is subject to a terminal disclaimer.

(21) Appl. No.: 14/065,668

(22) Filed: Oct. 29, 2013

(65) Prior Publication Data

US 2015/0121080 A1    Apr. 30, 2015

(51) Int. Cl.
  *H04L 9/32* (2006.01)
  *G06F 21/64* (2013.01)

(52) U.S. Cl.
  CPC .......... *H04L 9/3247* (2013.01); *G06F 21/64* (2013.01); *G06F 2221/2101* (2013.01); *H04L 2209/72* (2013.01)

(58) Field of Classification Search
  None
  See application file for complete search history.

(56) References Cited

U.S. PATENT DOCUMENTS

| 5,915,248 | A | 6/1999 | Kinoshita et al. |
| 6,240,091 | B1 * | 5/2001 | Ginzboorg .............. H04L 12/14 370/270 |
| 7,461,233 | B2 | 12/2008 | Hsieh et al. |
| 8,261,319 | B2 | 9/2012 | Libin et al. |
| 8,271,804 | B2 | 9/2012 | Kudo |
| 8,769,311 | B2 * | 7/2014 | Koifman et al. ............. 713/193 |
| 8,788,467 | B2 * | 7/2014 | Koifman et al. ............. 707/693 |
| 8,793,510 | B2 * | 7/2014 | Koifman et al. ............. 713/193 |
| 8,819,454 | B2 * | 8/2014 | Koifman et al. ............. 713/193 |
| 8,930,329 | B2 * | 1/2015 | Koifman et al. ............. 707/693 |
| 2002/0161742 | A1 | 10/2002 | Heiden et al. |
| 2002/0194484 | A1 * | 12/2002 | Bolosky .................. G06F 21/64 713/189 |
| 2003/0005306 | A1 * | 1/2003 | Hunt ................. G06F 17/30174 713/181 |

(Continued)

FOREIGN PATENT DOCUMENTS

JP     2004266536    *  9/2004

OTHER PUBLICATIONS

BleepingComputer.com, [online]; [retrieved on Mar. 5, 2015]; retrieved from the Internethttp://www.bleepingcomputer.com/forums/t/40108/how-to-use-event-viewerUsasma, "How to Use Event Viewer," Jan. 6, 2006, pp. 1-7.

*Primary Examiner* — Peter Poltorak
(74) *Attorney, Agent, or Firm* — Cantor Colburn LLP; William A. Kinnaman, Jr.

(57) ABSTRACT

A system for generating a digital signature may include a record management facility configured to group a first record with a second record and to generate a first digital signature based at least in part on the first record and the second record.

7 Claims, 3 Drawing Sheets

(56) References Cited

U.S. PATENT DOCUMENTS

| | | |
|---|---|---|
| 2003/0182552 A1 | 9/2003 | Tanimoto et al. |
| 2004/0143743 A1* | 7/2004 | Margolus .......... G06F 17/30097 713/176 |
| 2004/0210608 A1* | 10/2004 | Lee et al. ...................... 707/204 |
| 2006/0015500 A1* | 1/2006 | Heiden ................ G06Q 20/382 |
| 2006/0236401 A1 | 10/2006 | Fosdick |
| 2007/0101440 A1 | 5/2007 | Bhatia et al. |
| 2007/0233671 A1 | 10/2007 | Oztekin et al. |
| 2007/0271592 A1* | 11/2007 | Noda et al. ........................ 726/1 |
| 2008/0301457 A1 | 12/2008 | Uesugi et al. |
| 2009/0030949 A1 | 1/2009 | Saito |
| 2009/0125671 A1 | 5/2009 | Flynn et al. |
| 2012/0151221 A1* | 6/2012 | Koifman et al. ............. 713/189 |
| 2012/0191738 A1* | 7/2012 | Koifman et al. ............. 707/756 |
| 2012/0191739 A1* | 7/2012 | Koifman et al. ............. 707/756 |
| 2012/0197917 A1* | 8/2012 | Koifman et al. ............. 707/756 |
| 2012/0198275 A1* | 8/2012 | Koifman et al. ............... 714/19 |

* cited by examiner

COMPUTER-BASED OPTIMIZATION OF DIGITAL SIGNATURE GENERATION FOR RECORDS BASED ON EVENTUAL SELECTION CRITERIA FOR PRODUCTS AND SERVICES

BACKGROUND

The present invention relates generally to digital signature generation, and more specifically, to optimization of digital signature generation for records that may be selectively removed in groups from storage at a later time.

The demand for long-term, secure storage of electronic records, including, but not limited to computing logs, such as event logs, continues to grow, for example, due to increased regulations and auditing requirements. The need for such storage to be provided in a performance-sensitive manner also has become increasingly important, for example, as result of the potentially high throughput of logging that may be performed. This need is particularly acute among organizations that do large amounts of logging.

Digital signatures have been implemented in some existing log management systems to provide security for electronic records. For example, in some existing systems, a digital signature may be used for each event log entry rather than implementing a standard secure protocol. In existing systems, each event log has been provided with an individual digital signature, which may be subsequently used to validate the record, or ensure the individual log entry has not been tampered with during an intervening time period. In existing systems, groups of signed events may later be removed from storage, transferred in bulk, and then individually validated.

However, the computing time required to generate digital signatures for large numbers of records in some cases may become burdensome. For example, the generation of large numbers of digital signatures for stored records may effectively limit the throughput of logging that may be performed, or even negatively affect overall computer performance.

SUMMARY

According to an embodiment of the present invention, a system for generating a digital signature includes a record management facility configured to group a first record with a second record and to generate a first digital signature based at least in part on the first record and the second record.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

An embodiment in accordance with the present invention may provide a method for grouping a set of multiple records and providing a single digital signature across the set of records. The group may be defined, or delineated, for example, based on one or more known selection criteria related to the anticipated manner in which the records eventually may be accessed. The set of records may subsequently be removed from storage, transferred in bulk and validated as a group.

In an embodiment in accordance with the present invention, multiple event logs may be signed together, and validated together, as a group. This method may decrease the system resources required to perform the signing, or digital signature generation, function in a long-term, secure, electronic storage system. For example, the system resources required to generate digital signatures may be reduced to that currently required to sign only a fraction of the records logged in an existing system. This method may facilitate high-volume, secure data storage. This method may further help avoid overloading encryption resources while maintaining high throughput.

An embodiment in accordance with the present invention may group sets of records by record type and implement a signing interval defined by downstream processing criteria associated with the data, as opposed to basing the signing interval on perceived efficiencies at the point of data generation or digital signature generation.

An embodiment in accordance with the present invention may be applied to any logging system in which log records may be queried based on one or more criteria. Thus, an embodiment may be implemented in a new electronic storage system, or may be added to existing or future electronic storage systems, for example, as an optional add-on feature.

Figure 1:
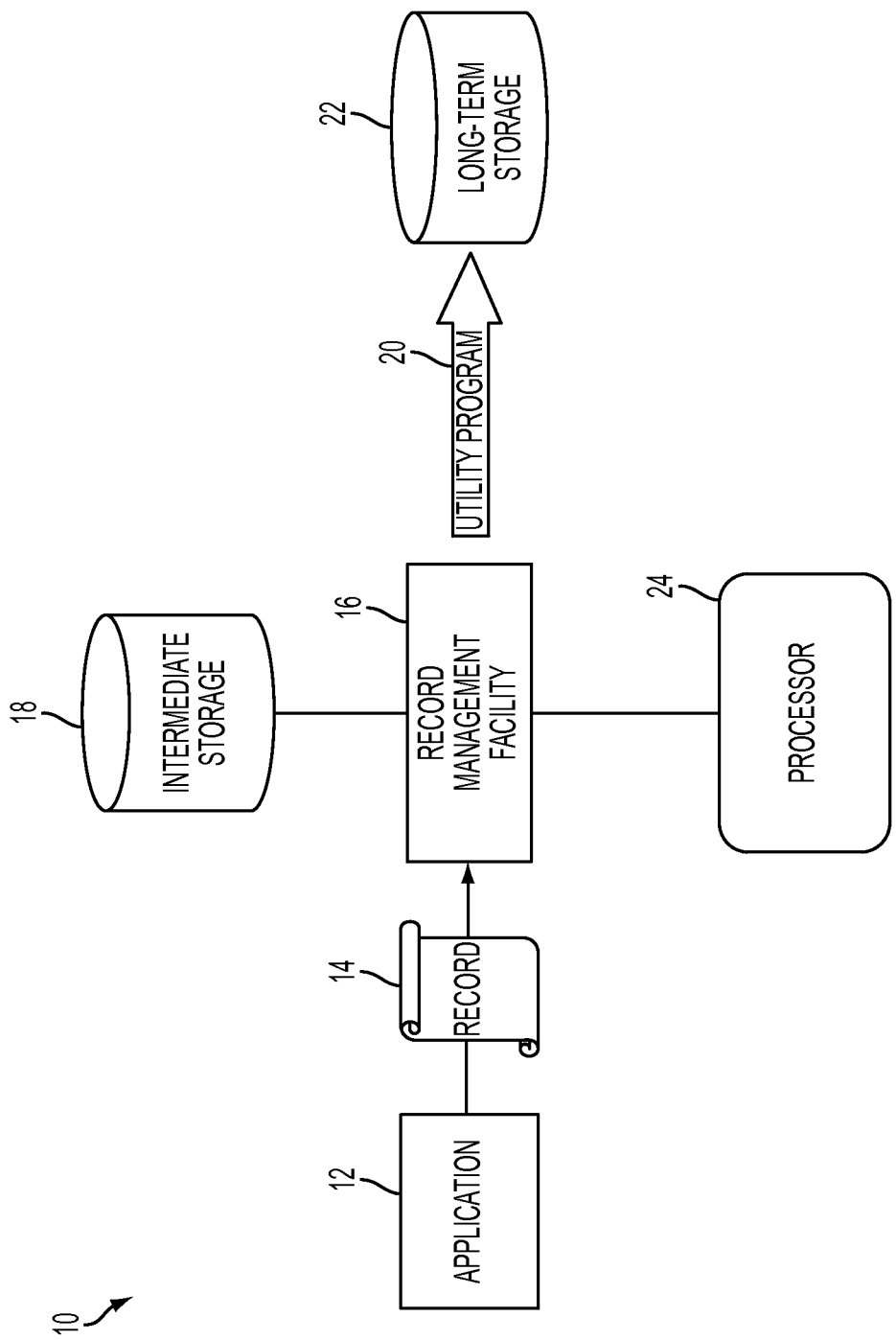
FIG. 1 is a schematic diagram of a system for long-term, secure storage of electronic records.

With reference now to FIG. 1, an exemplary electronic record system 10 may include an application 12, a record 14, a record management facility 16, intermediate storage 18, a utility 20, long-term storage 22, and a processor 24. The processor 24 may include any computer processing device, or any combination of computer processing devices, capable of supporting the functions of the electronic record system 10. For example, in any embodiment, the electronic record system 10 may be implemented using a mainframe computer, a server, a desktop personal computer, a laptop computer, a notebook computer, a tablet computing device, a mobile computing device, or any combination of these, or any other suitable computer processing device.

In any embodiment, the processor 24 may further include one or more memory devices, including by not limited to read-only memory (ROM), random access memory (RAM), or a cache memory; one or more an input/output (I/O) devices, including but not limited to a monitor, a keyboard, a pointing device; one or more storage devices, including but not limited to a hard disk drive (HDD), a compact disk (CD) drive, an integral or removable solid-state memory device (SSD); a network connection interface; as well as other integral, peripheral or accessory computer components as are known in the art.

The application 12 may include any program, module, software or the like, configured to operate in conjunction with a computer processing device, that may produce records, such as, for example, event logs, that may be digitally, electronically, magnetically, optically, or otherwise, stored. For example, in any embodiment the application 12 may include a monitoring system, database manager, a word processor, a graphical user interface, a device driver, a network interface manager, or any other suitable program, module, software, or the like. In an embodiment the application 12 may include an operating system. An embodiment may include multiple programs, modules, software, or the like.

The record 14 may include any data or information that may be produced in association with the operation of a computer processing device or application, such as, for example, logfiles, or event logs, that may be digitally, electronically, magnetically, optically, or otherwise, stored. In any embodiment, the record 14 may include system data, such as, for example, access data, audit data, event audit data, transaction data, security data, performance metric data, or the like. In addition, in any embodiment, the record 14 may include client-defined data, such as, for example, billing data, pricing data, or the like. An embodiment may include multiple types of records.

The record management facility 16 may be configured to perform document management regarding the record 14. For example, the record management facility 16 may perform systematic control over document-related functions, such as, for example, the creation, receipt, classification, indexing, maintenance, use, and disposition of the record 14.

The record management facility 16 may receive, or accept, the record 14 from the application 12. In an exemplary embodiment, each record 14 may include a timestamp, or a timestamp may be associated with each record 14. For example, the timestamp may represent the time at which the application 12 created the record 14, or the time at which the application 12 sent the record 14 to the record management facility 16.

The intermediate storage 18 may be communicatively connected to the record management facility 16. The record management facility 16 may buffer, or temporarily store, the record 14 in the intermediate storage 18 for a period of time, for example, in accordance with an enterprise record retention policy. In an embodiment, the record 14 may be stored in the intermediate storage 18, for example, in a block of records as defined by a policy of the record management facility 16. In an alternative embodiment, the records may not be stored in blocks.

The intermediate storage 18 may include any type of computer memory medium organized in any format, such as, for example, a relational model database server, a hierarchical database, an information management system, a virtual storage access method server, a hard disk drive (HDD), a magnetic tape, a disk drive, a compact disk (CD) drive, an integral or removable solid-state drive (SSD), or any other suitable memory medium.

The record management facility 16 may group a set of records together and provide a single digital signature across the set of records. For example, the record management facility 16 may group a set of records based on one or more selection criteria. In an embodiment, the selection criteria may include how the records may be accessed or retrieved at a later time, that is, the manner or method by which the records, including, for example, record 14, may be accessed or recalled.

For example, in an exemplary embodiment, the main selection criteria exploited may include time period or frequency, that is, the fact that records typically may be accessed based on some discrete time unit, for example, at discrete intervals of five minutes, three minutes or one minute. Based on the time period, a single digital signature may be assigned to a set of records corresponding to the interval. Thus, in this example, as the volume of records produced per time period increases, that is, as the frequency of records increases, the optimization also increases.

The advantageous effect of the optimization is a result of the digital signature being generated only once per time period, or interval. For example, the digital signature may be generated for a set of records each minute on the minute boundary. This facilitates the accommodation of localized spikes in record generation, for example, in the case that a relatively large number of records are produced at discrete time intervals, such as approximately at the top of each hour or at market open conditions. In this case, a relatively large set of records corresponding to the discrete time period may be assigned a single digital signature, resulting in relatively large savings of computer processing time and resources.

In addition, multiple sub-criteria may be used to group records. For example, in an embodiment, several types of records maybe generated by the application 12, or by multiple applications. In this case, the record management facility 16 may group records that share more than one sub-criteria as the same type. For example, records that are likely to remain together as they move through post-processing systems may be grouped as a set of records, and a single digital signature may be generated for the set.

As records are processed, for example, by the record management facility 16, each record may be classified as going to one or more intermediate data stores, such as intermediate storage 18. In an embodiment, each data store may be independently managed. In addition, the intermediate storage 18 may be shared by multiple independent computer systems, each having a unique identifier.

The record 14 may later be extracted from the intermediate storage 18, for example, by the utility 20. The utility 20 may include, for example, a utility program configured to receive the record 14 from the record management facility 16, or to retrieve the record 14 from the intermediate storage 18, and send the record 14 to the long-term storage 22. In an embodiment, the utility 20 may use the digital signature to ensure that the integrity of the content, context and structure of the record 14 has been preserved and protected, that is, the authenticity, reliability, trustworthiness, or privacy of the data contained in the record 14 may be verified, or validated, based on the digital signature.

In any embodiment, the utility 20 may selectively remove the record 14 according to a predetermined policy, or set of rules. For example, the utility 20 may selectively remove a set of records including the record 14 based on record type or based on a timestamp. In an embodiment, the utility 20 may be external to the record management facility 16. Thus, the record management facility 16 and the utility 20 may share an embedded or linked protocol that allows the record management facility 16 to create, or generate, the digital signature and the utility 20 to verify, or validate, the digital signature assigned to a set of records.

An embodiment may leverage the selection criteria to group sets of records according to some meaningful or useful basis. For example, in an embodiment, the utility 20 may be configured to retrieve records from the intermediate storage 18 and send the records to long-term storage 22 at discrete intervals of time. The interval of time may be referred to as the granularity of the utility 20. For example, in an exemplary embodiment, the utility granularity may be one minute, that is, the utility 20 may be configured to retrieve records from the intermediate storage 18 and send the records to long-term storage 22 each minute, or on the minute boundary. Thus, in this embodiment, sets of records may be grouped into discrete one-minute sets according to the timestamp associated with each record, such that the grouping criterion corresponds to the utility granularity.

When the utility 20 processes records from the record management facility 16, the utility 20 may provide one or more properties with each record 14, or with each set of records, which may be used to determine which records should be moved from the record management facility 16, or intermediate storage 18, to the long-term storage 22. For example, the utility 20 may provide a start time value and an end time value, which may include some inherent, or fixed, granularity, that is, the minimum interval at which the time value may be assigned or differentiated.

A person of ordinary skill in the art will readily apprehend that the record granularity may not necessarily be the same as the utility granularity. However, in order to provide an optimization advantage, the utility granularity must be coarser than the record granularity, or that of the record timestamp. That is, in order to achieve performance or efficiency gains, more than one record must be produced during each period of the utility 20. Thus, for example, increased efficiencies may be achieved where the granularity of the record timestamp is a hundredth of a second and the granularity of the utility program is a minute.

The utility 20 may further provide a property regarding the record number, or type, and a property regarding the system of origin. Based on these properties, the electronic record system 10 may be configured to filter the records and place records having different record numbers or records from different systems into segregated long-term storage 22. In an alternative embodiment, additional filters may be defined.

Figure 2:
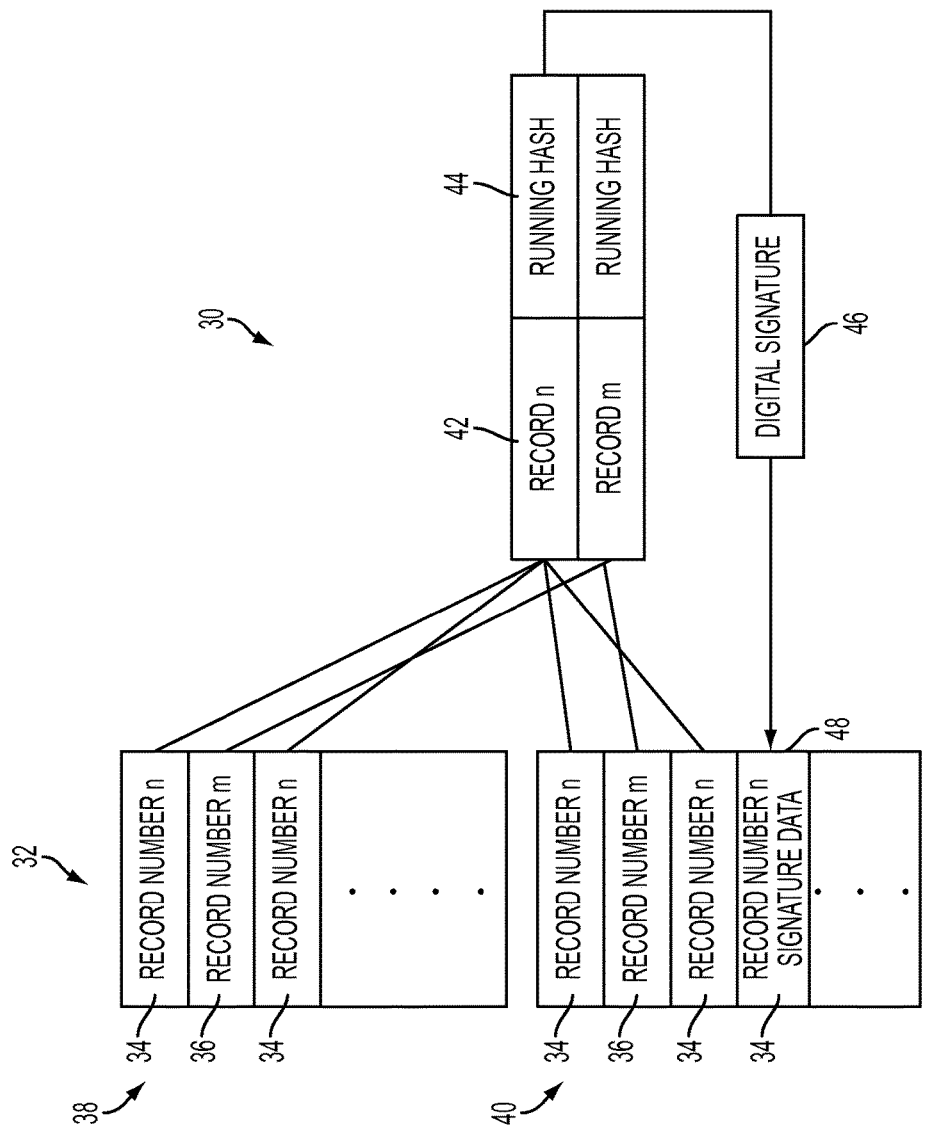
FIG. 2 is an illustration of a system for optimizing digital signature generation for records based on eventual selection criteria.

With reference to FIG. 2, an electronic record system 30 may include multiple types of records 32. Each type of record may be denoted by a record number, such as, for example, record number n 34 and record number m 36. The records may be organized into memory blocks, such as, for example, block one 38 and block two 40. Records of the same type, that is, records having the same record number, may have the same or similar format, and may be processed together.

As records 32 arrive at a record management facility, destined for intermediate data storage, the electronic record system 30 may begin the digital signing process. Records of a specific record number 34, 36 originating from a particular system may be grouped together as sets 42. As records are received, a running hash value 44 may be kept for each record number 34, 36. Records 32 may be accumulated during an accumulation period, for example, corresponding to the utility granularity.

At the end of the accumulation period, a digital signature 46 may be generated for the entire set 42 of records corresponding to each record number 34, 36. For example, in an embodiment, generation of the digital signature 46 may be triggered based on two thresholds being met. First, the record timestamp has reached the granularity of the utility program, such as the utility 20 of FIG. 1, and second, the amount of data which has been hashed is within an optimal range for digital signature 46 generation, that is, the amount of data does not exceed a maximum threshold.

In an alternative embodiment, the threshold accumulation period may exceed the granularity of the utility program. The digital signature 46 may be calculated, for example, based on a one-way hash algorithm with encryption. In various embodiments, any suitable hash algorithm, as well as any suitable encryption method, may be employed.

The digital signature 46 and associated metadata 48 may be stored with the records 32 in long-term storage. In an embodiment, the metadata 48 stored with the digital signature 46 may include, for example, the record number 34, 36 system of origin, the start and end record timestamps, or timestamp range, and the number of records covered by the digital signature 46.

When the utility 20 processes the record 14 and moves it to long-term storage 22, the utility 20 may move a set of records corresponding to one or more discrete time units, or intervals, at a time, and in turn transfer a single corresponding digital signature 46 for the set of records. In an embodiment, a set of records corresponding to one or more discrete intervals may be verified, or validated, by the utility 20 before the set of records is sent to long-term storage 22.

In any embodiment, the set of records may be verified as a group, for example, by a verification program, using the digital signature 46 at a subsequent time when the set of records is retrieved from the long-term storage 22. Verification of the data in the set of records against the digital signature 46 may be performed in like manner to the digital signature generation method above, that is, by keeping a running hash, and clearing the running hash each time a digital signature 46 is encountered and verified, for example, at a time interval boundary.

Figure 3:
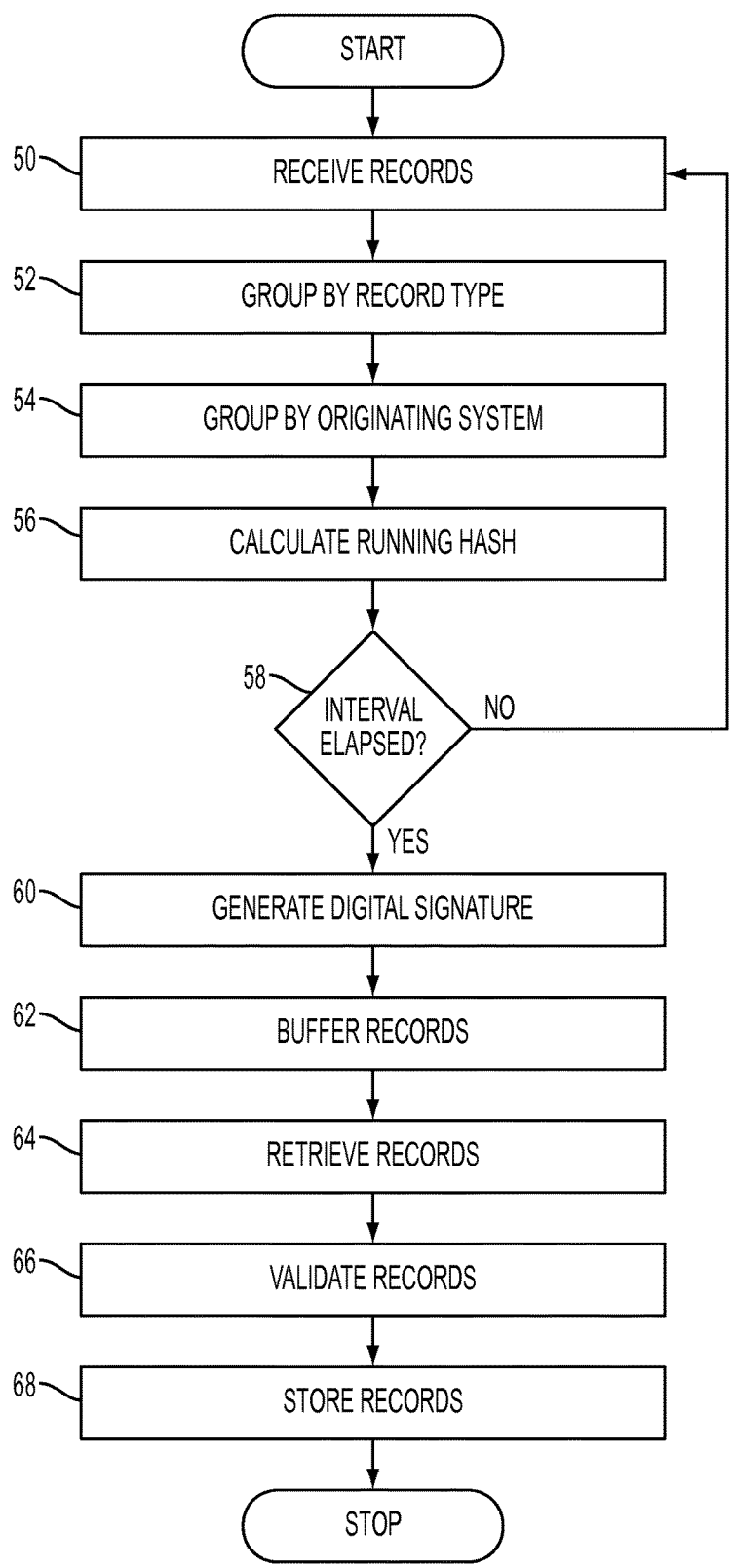
FIG. 3 is a flow diagram of a method for optimizing digital signature generation for records based on eventual selection criteria.

With reference now to FIG. 3, a method in accordance with the present invention may include receiving records, in block 50. For example, a sequential listing of event logs may be received from an application. In any embodiment, the application may be running on the same computer system, or the record may be received from another computer system. The records may include any data or information that may be produced in association with the operation of a computer processing device or application, including, but not limited to system data or client-defined data. The records may further include more than one type of record.

In block 52, the records may be grouped, sorted or filtered by record type, for example, based on a record number. For example, in any embodiment, the record number may correspond to a file format or source application. In block 54, the records may be grouped, sorted or filtered by originating system, for example, based on a system identifier. For example, in any embodiment, records may be received from multiple systems, and the system identifier may correspond to a particular computing system or location. In various embodiments, additional filters may be implemented based on additional selection criteria, that is, according to the manner in which the records likely may be accessed or retrieved at a later time.

In block 56, a running hash may be calculated, for example, using one or more records as input. For example, in any embodiment, a set of records grouped by record type may be input to a hash function to calculate the running hash value, or a set of records grouped by origin may be input to a hash function to calculate the running hash value. In an embodiment, each record may include a timestamp representing the time at which the record was received, and records may be accumulated in blocks 50-56 until an interval has elapsed, in block 58. For example, records may be accumulated until a time interval, such as, for example, a time period equal to a utility granularity, has elapsed. If the interval has not elapsed in block 58, the method may continue at blocks 50-56.

When the interval has elapsed, then the method may continue at block 60, in which a digital signature may be generated, for example, corresponding to a set of records of a particular type, or corresponding to a set of records from a particular origin, which has accumulated during the time interval. For example, the set of records, or the current running hash value, may be input to a one-way hash algorithm to compute a digital signature corresponding to the set of records.

In block 62, the set of records may be buffered, that is, stored in intermediate storage, or temporarily stored, as well as the digital signature and metadata associated with the digital signature. In an embodiment, the digital signature and metadata may be stored together with the record set. In another embodiment, the digital signature and metadata may be linked to the record set.

A set of records set may be retrieved, or extracted, from the buffer, or intermediate storage, along with the corresponding digital signature and metadata, in block 64, and the data in the record may be verified, or validated, using the digital signature in block 66. The records may be sent to a long-term storage archive in block 66.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. An electronic record system for generating a digital signature, comprising:
   a record management facility configured to:
      accumulate a plurality of records during an signing interval, the plurality of records including a first record, a second record, and a third record, the signing interval being equal to a utility granularity of a utility program of the record management facility,
      wherein the utility granularity is coarser than a granularity of each record timestamp of each record of the plurality of records to optimize performance gains of the accumulation of the plurality of records,
      group the first record with the second record,
      wherein the first record and the second record are grouped in the first set based on the first record and the second record corresponding to a first record type of a plurality of record types, and
      generate a first digital signature by utilizing at least in part the first record and the second record when an amount of hashed record data is within a range that does not exceed a maximum threshold and when a record timestamp of a record of the plurality of records received within the signing interval has reached the utility granularity,
      group a third record in a second set based on the third record corresponding to a second record type of the plurality of record types,
      generate a second digital signature based at least in part on the third record,
      wherein each of the first and second sets corresponds to the signing interval that is verified or validated by the utility program before the first and second sets are sent to a long-term storage; and
   a processor comprising a memory and configured to support operations of the record management facility,
   wherein the first record type is different from the second record type.

2. The system of claim 1, wherein the record management facility is further configured to store the first digital signature in association with the first record and the second record.

3. The system of claim 1, wherein the record management facility is further configured to retrieve the first digital signature, the first record and the second record from an intermediate storage, and to send the first digital signature, the first record and the second record to the long-term storage.

4. The system of claim 1, wherein the first record includes a first event log and the second record includes a second event log.

5. The system of claim 1, wherein the record management facility is further configured to accumulate a plurality of records during the signing interval and to generate the first digital signature based at least in part on the signing interval having elapsed.

6. The system of claim 1, wherein the granularity of the record timestamps is a hundredth of a second and a utility granularity is a minute.

7. The system of claim 1, wherein the first and second digital signatures include, record number system of origin, start and end record timestamps or a timestamp range, and number of records covered by the first and second digital signature.

* * * * *